United States Patent
Chatlani et al.

(10) Patent No.: US 11,425,494 B1
(45) Date of Patent: Aug. 23, 2022

(54) AUTONOMOUSLY MOTILE DEVICE WITH ADAPTIVE BEAMFORMING

(71) Applicant: Amazon Technologies, Inc., Seattle, WA (US)

(72) Inventors: Navin Chatlani, Palo Alto, CA (US); Amit Singh Chhetri, Sunyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 214 days.

(21) Appl. No.: 16/439,139

(22) Filed: Jun. 12, 2019

(51) Int. Cl.
| | |
|---|---|
| G10L 21/02 | (2013.01) |
| H04R 1/40 | (2006.01) |
| G06F 3/16 | (2006.01) |
| G05D 1/00 | (2006.01) |
| G05D 1/02 | (2020.01) |
| G10L 15/22 | (2006.01) |
| G10L 15/20 | (2006.01) |
| G10L 21/0208 | (2013.01) |
| G10L 25/78 | (2013.01) |
| G10L 21/0216 | (2013.01) |

(52) U.S. Cl.
CPC .......... H04R 1/406 (2013.01); G05D 1/0088 (2013.01); G05D 1/0255 (2013.01); G06F 3/16 (2013.01); G10L 15/22 (2013.01); G10L 21/02 (2013.01); G10L 15/20 (2013.01); G10L 21/0208 (2013.01); G10L 25/78 (2013.01); G10L 2021/02165 (2013.01); G10L 2021/02166 (2013.01)

(58) Field of Classification Search
None
See application file for complete search history.

(56) References Cited

U.S. PATENT DOCUMENTS

| | | | | |
|---|---|---|---|---|
| 9,634,750 | B2* | 4/2017 | Kwak | H04B 7/0695 |
| 9,973,848 | B2* | 5/2018 | Chhetri | H04R 3/005 |
| 2005/0195989 | A1* | 9/2005 | Sato | B25J 13/003 |
| | | | | 381/92 |
| 2005/0281410 | A1* | 12/2005 | Grosvenor | H04H 60/04 |
| | | | | 381/61 |
| 2012/0215519 | A1* | 8/2012 | Park | G10L 21/0208 |
| | | | | 704/2 |
| 2015/0282001 | A1* | 10/2015 | Kwak | H04B 7/0695 |
| | | | | 370/229 |
| 2019/0210227 | A1* | 7/2019 | Casner | G01S 5/0215 |
| 2020/0053490 | A1* | 2/2020 | Shriner | H01Q 1/273 |

\* cited by examiner

*Primary Examiner* — Richard Z Zhu
(74) *Attorney, Agent, or Firm* — Pierce Atwood LLP

(57) ABSTRACT

A device capable of motion includes a beamformer for determining audio data corresponding to one or more directions. The beamformer includes a target beamformer that boosts audio from a target direction and a null beamformer that suppresses audio from that direction. When the device outputs sound while moving, the target and null beamformers capture and compensate for Doppler effects in output audio that reflects from nearby surfaces back to the device.

21 Claims, 12 Drawing Sheets

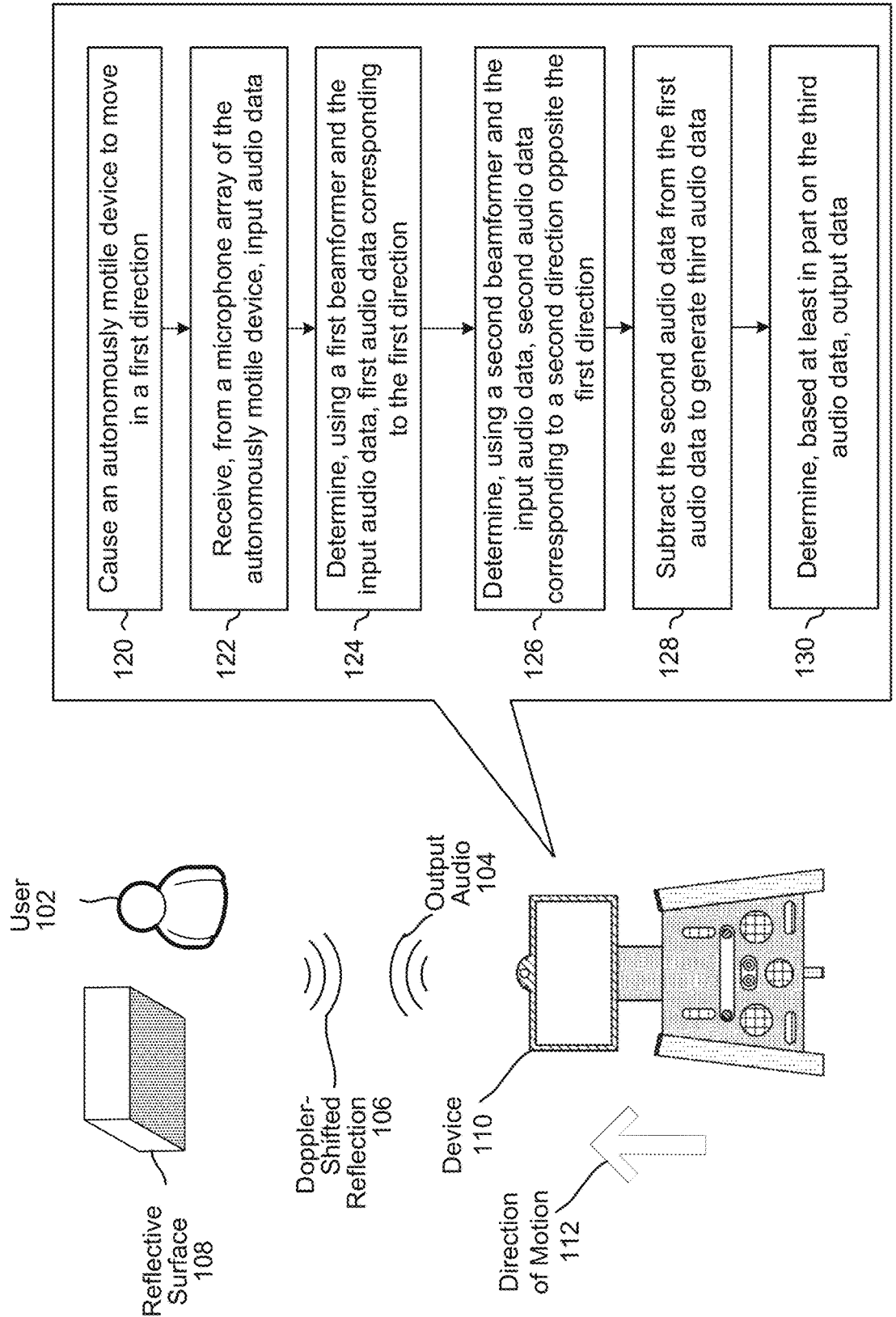

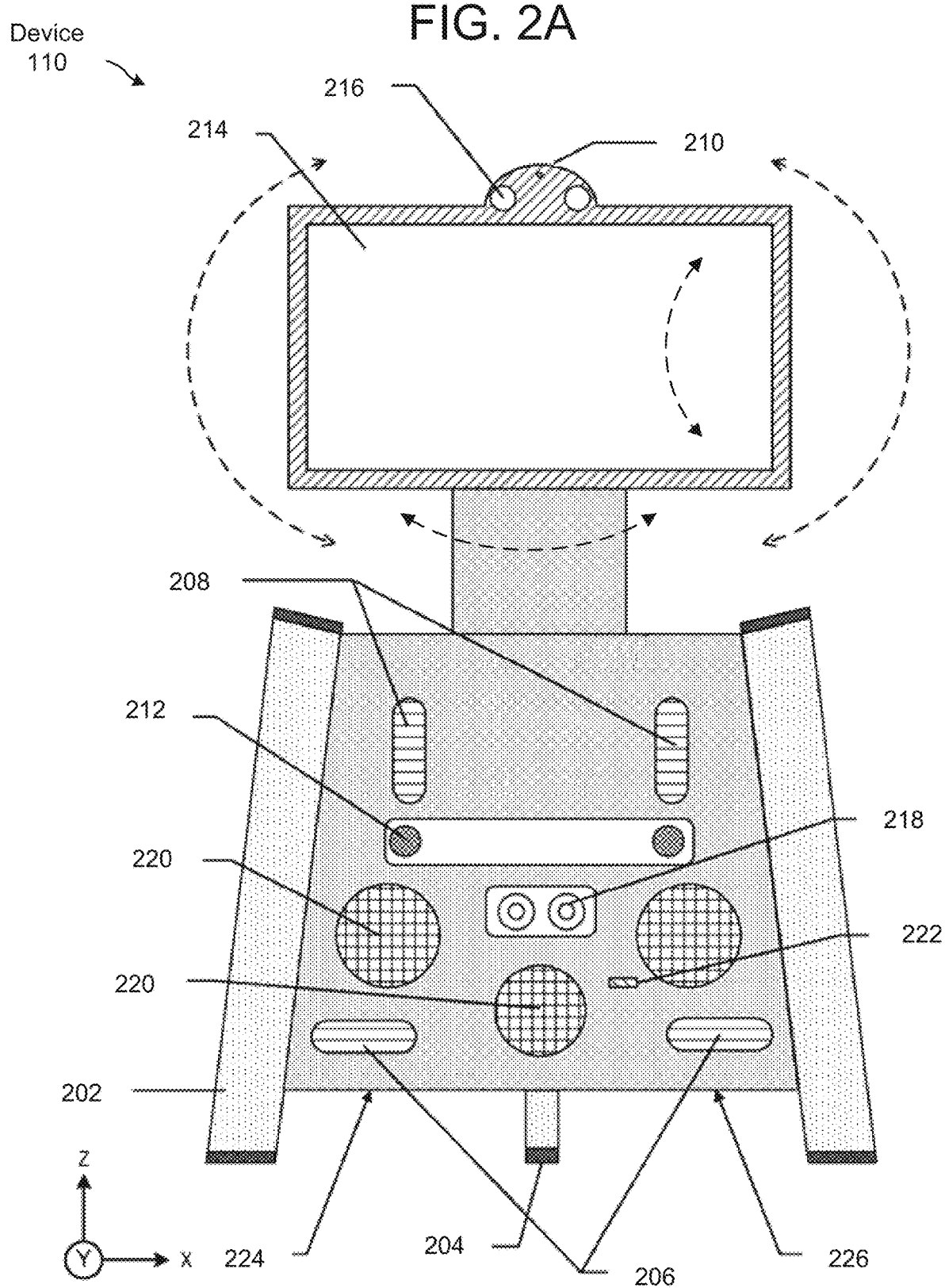

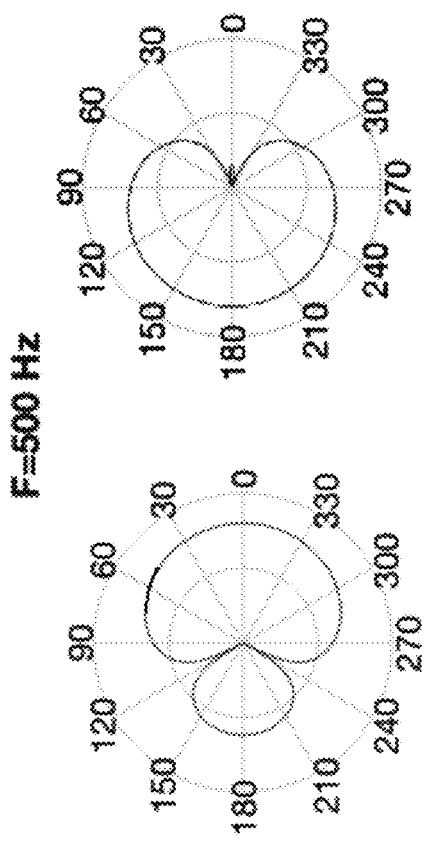
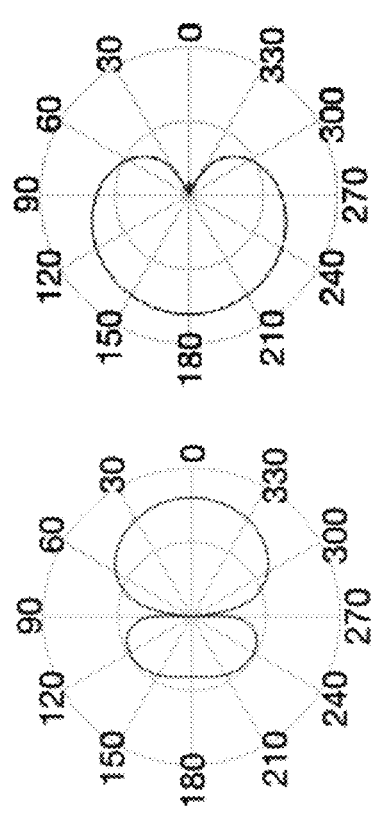
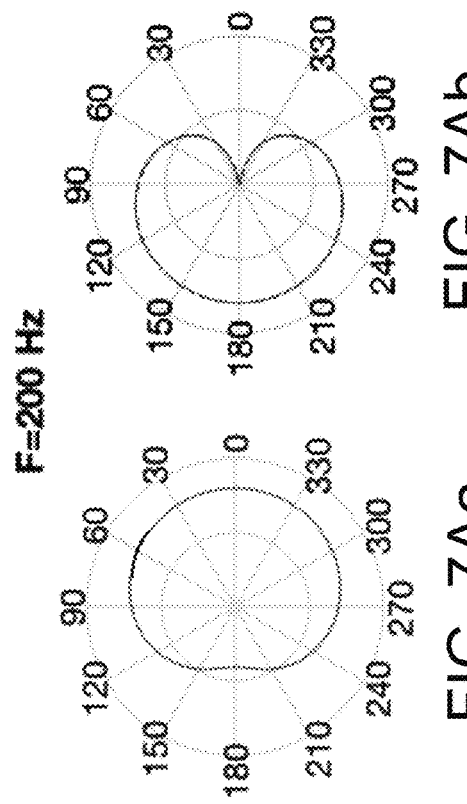
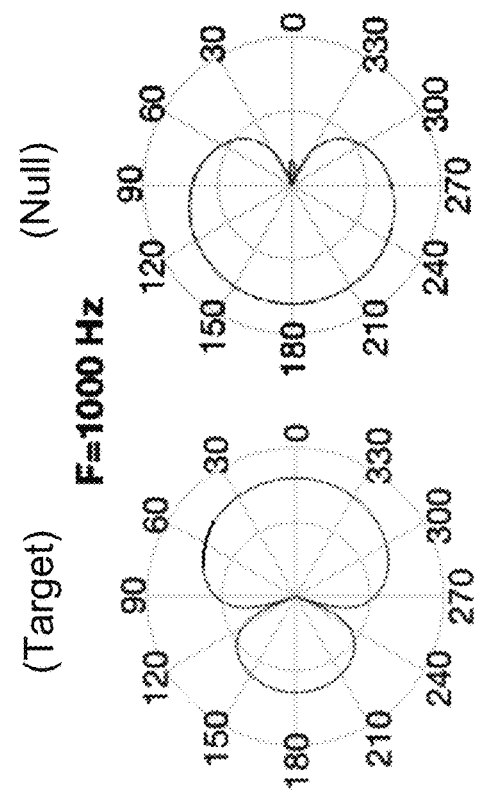

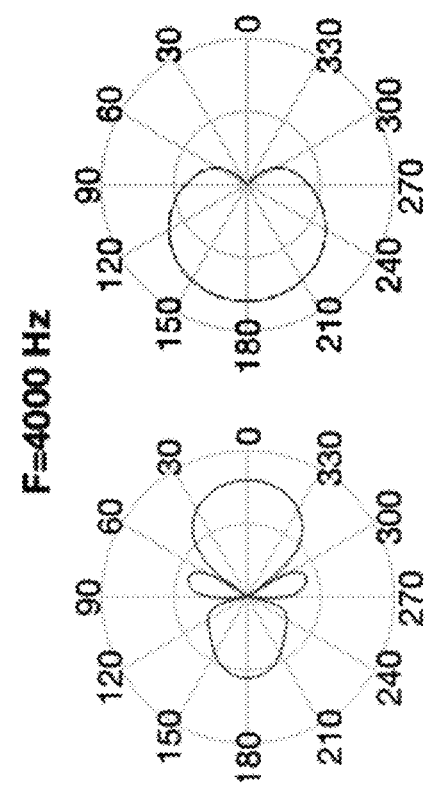
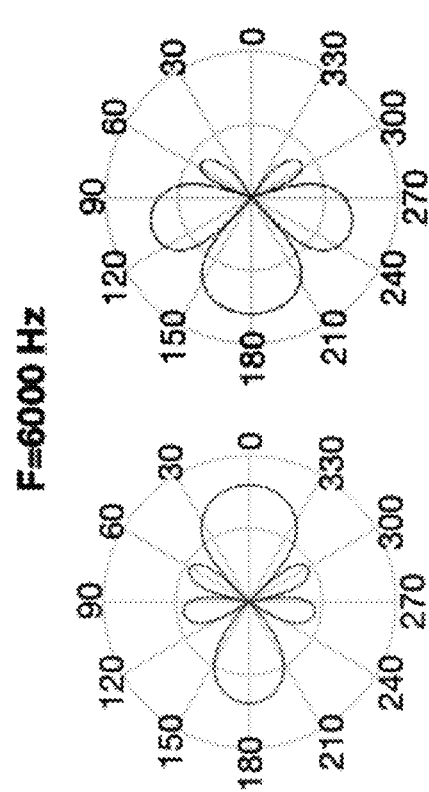
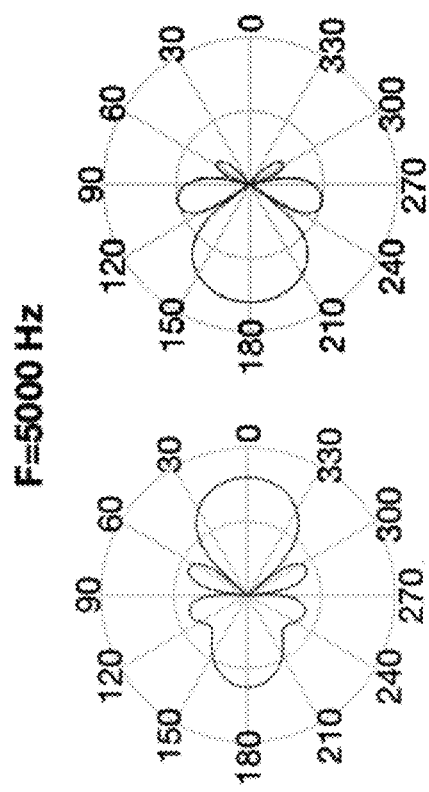
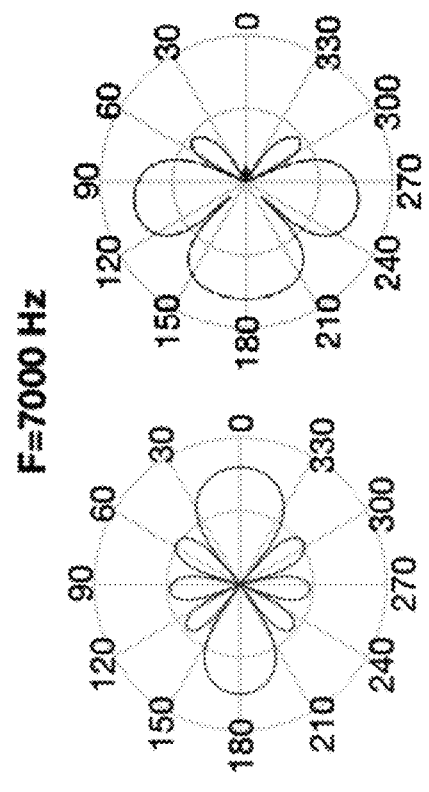

AUTONOMOUSLY MOTILE DEVICE WITH ADAPTIVE BEAMFORMING

BACKGROUND

In audio systems, beamforming refers to techniques that use a microphone array to isolate audio from particular directions into directional audio data—called beams—and then select one beam for further audio processing. Beamforming may further be used to filter out noise originating from other directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 1 illustrates a system and method for beamforming using a device capable of autonomous motion according to embodiments of the present disclosure.

FIGS. 2A, 2B, and 2C illustrate views of a device capable of autonomous motion according to embodiments of the present disclosure.

FIGS. 7A-7H illustrate beamforming patterns according to embodiments of the present disclosure.

DETAILED DESCRIPTION

Figure 2B:
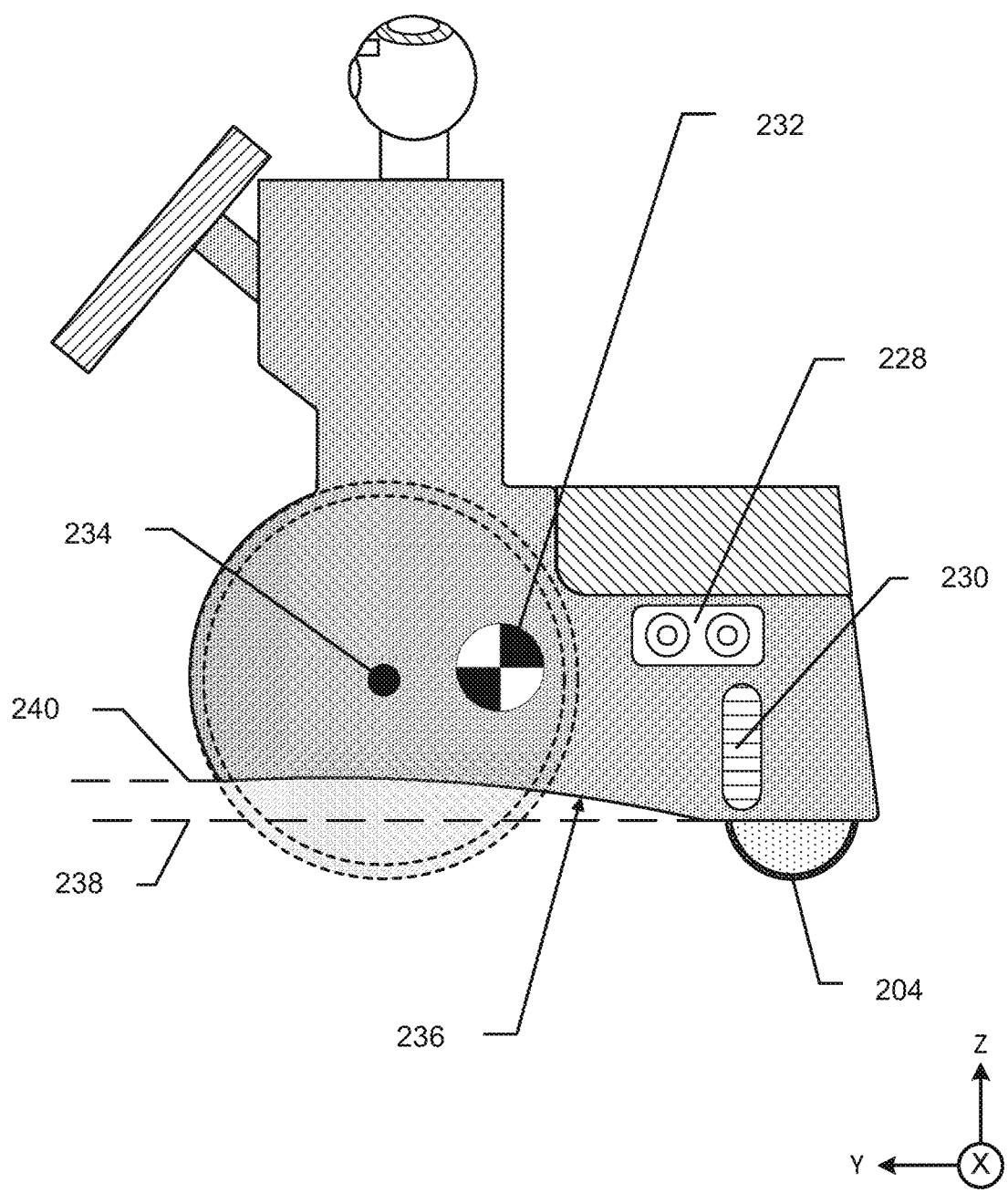

An autonomously motile device—e.g., a robot—may include a speech-recognition system. Speech-recognition systems have progressed to a point at which humans may interact with the devices using speech. Such systems employ techniques to identify the words spoken by a human user based on the various qualities of a received audio input. Speech recognition combined with natural-language understanding processing techniques enable speech-based user control of a computing device to perform tasks based on the user's spoken commands. The combination of speech recognition and natural-language understanding processing techniques is commonly referred to as speech processing. Speech processing may also convert a user's speech into text data which may then be provided to various text-based software applications. Speech processing may be used by autonomously motile devices, computers, hand-held devices, telephone computer systems, smart loudspeakers, kiosks, and a wide variety of other devices to improve human-computer interactions. As described herein, an autonomously motile device may include a device that is capable of moving in an environment with or without a direct user command to do so. For example, an autonomously motile device may include wheels mounted on a housing that are driven by a motor; the device may further include sensors for sensing the environment and input/output devices for communicating with a user. The device may use its wheels, motor, sensors, and input/output devices to, for example, follow a user of the device throughout the environment.

Certain devices capable of capturing speech for speech processing may operate using a microphone array comprising multiple microphones, in which beamforming techniques operate on the audio captured by the microphone array. In audio systems, beamforming refers to techniques that are used to isolate audio from one or more particular directions. Beamforming may be particularly useful when filtering out noise from non-desired directions. Beamforming may be used for various tasks, including isolating voice commands to be executed by a speech-processing system.

A fixed beamformer component may isolate audio from particular directions by applying one or more filters, each having different filter coefficients, to exploit variations in the time each microphone in the array receives audio from each direction. An adaptive beamformer may remove noise by identifying a direction in which a noise source lies and removing the noise from desired audio. A beam selection component selects at least one beam from a plurality of beams corresponding to a desired direction, such as a direction toward which a user is disposed.

Performing beamforming using an autonomously motile device may, however, present challenges. Audio data captured by the device may include reflections of sounds output by the device and reflected back to the device from one or more reflective surfaces. Because the autonomously motile device may be moving as it outputs the sounds, however, the reflections may be affected by this movement. Reflections returned from reflective surfaces in the direction of movement may have a higher frequency than expected; the motion of the autonomously motile device decreases the effective wavelength of sounds also traveling in the direction of movement, thereby increasing their frequency. Similarly, reflections returned from reflective surfaces opposite the direction of movement may have a lower frequency than expected; the motion of the device increases the effective wavelength of sounds also traveling opposite the direction of movement, thereby decreasing their frequency. The effect may be referred to as the Doppler shift; a familiar example of it is a locomotive's horn changing pitch as it passes by.

Acoustic-echo cancellation refers to techniques that reduce or eliminate audio output by a loudspeaker of the autonomously motile device from audio received by a microphone of the autonomously motile device. Without acoustic-echo cancellation, any sound output by the loudspeaker would be re-captured by the microphone, and the resultant audio data would not just include sounds, such as utterances of a user, local to the device (e.g., "near-end" sounds), but also sounds, such as music or speech, sent to and output by the device ("far-end" sounds). As explained in greater detail below, acoustic-echo cancellation subtracts the far-end sounds from received audio data. Because of the Doppler shift described above, however, the far-end sounds output by the device may differ from reflected far-end sounds received by the microphone. This difference may result in less-than-optimal acoustic-echo cancellation.

Embodiments of the present disclosure thus describe performing adaptive beamforming to account for and reduce or eliminate errors in acoustic echo cancellation that arise due to Doppler shift. In various embodiments, the device moves in a first direction, and a target beamformer isolates audio from that direction. A second, different beamformer forms a null in the first direction; audio data determined by this null beamformer includes at least audio data corresponding to a direction opposite the first direction. For example, if the device is moving in a direction corresponding to zero degrees, the target beamformer points at zero degrees while the null beamformer includes data corresponding at least to 180 degrees. An adaptive filter uses one or more transfer functions to model the environment of the device, which may include one or more reflective surfaces. The device subtracts the output of the adaptive filter from the output of the target beamformer to remove noise data from the target data. Because the null beamformer includes data opposite the target data, the removal of the noise data removes Doppler-shifted audio data from the target data.

FIG. 1 illustrates a system that includes an autonomously motile device 110, which is described in greater detail below. In various embodiments, the autonomously motile device 110 is capable of autonomous movement/motion using one or motors powering one or more wheels, treads, robotic limbs, or similar actuators, but the present disclosure is not limited to particular method of autonomous movement/motion. The device 110 may, for example, follow a user 102 around a room to thereby allow the user 102 easier access to features of the device 110. If the device 110 is moving in a first direction of motion 112, output audio 104 of the device 110 may reflect from one or more reflective surfaces 108; the resultant reflected audio 106 may include a Doppler shift.

The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance 104, from the user 104. The utterance may be, for example, a command or request. The device 110 may also be used to output audio to the user 102, such as audio related to a command or audio related to a request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. The disclosure is not, however, limited to only these devices or components, and the device 110 may include additional components without departing from the disclosure.

In various embodiments, with reference to FIG. 1, the device 110 causes (120) an autonomously motile device to move in a first direction. The device 110 receives (122), from a microphone array of the autonomously motile device, input audio data. The device 110 determines (124), using a first beamformer and the input audio data, first audio data corresponding to the first direction. The device 110 determines (126), using a second beamformer and the input audio data, second audio data corresponding to a second direction opposite the first direction. The device 110 subtracts (128) the second audio data from the first audio data to generate third audio data. The device 110 determines (130), based at least in part on the third audio data, output data (for, e.g., audio processing).

FIG. 2A illustrates a front view of the autonomously motile device 110 according to various embodiments of the present disclosure. The device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

One or more cameras 212 may be mounted to the front of the device 110; two cameras 212 may be used to provide for stereo vision. The distance between two cameras 212 may be, for example, 5-15 centimeters; in some embodiments, the distance is 10 centimeters. In some embodiments, the cameras 212 may exhibit a relatively wide horizontal field-of-view (HFOV). For example, the HFOV may be between 90° and 110°. A relatively wide FOV may provide for easier detection of moving objects, such as users or pets, which may be in the path of the device 110. Also, the relatively wide FOV may provide for the device 110 to more easily detect objects when rotating or turning.

Cameras 212 used for navigation may be of different resolution from, or sensitive to different wavelengths than, other cameras 212 used for other purposes, such as video communication. For example, navigation cameras 212 may be sensitive to infrared light allowing the device 110 to operate in darkness or semi-darkness, while a camera 216 mounted above a display 214 may be sensitive to visible light and may be used to generate images suitable for viewing by a person. A navigation camera 212 may have a resolution of at least 300 kilopixels each, while the camera 216 mounted above the display 214 may have a resolution of at least 10 megapixels. In other implementations, navigation may utilize a single camera 212.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another. An ultrasonic sensor 218 may be mounted on the front of the device 110 and may be used to provide sensor data that is indicative of objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical motion sensors (FOMS) 224, 226 may be disposed on the underside of the device 110. The FOMS 224, 226 may provide indication indicative of motion of the device 110 relative to the floor or other surface underneath the device 110. In some embodiments, the FOMS 224, 226 comprise a light source, such as light-emitting diode (LED) and/or an array of photodiodes. In some implementations, the FOMS 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the FOMS 224, 226 may provide other information, such as data indicative of a pattern present on the floor, composition of the floor, color of the floor, and so forth. For example, the FOMS 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 110 is shown in a trailing configuration, in which the caster 110 is located behind or aft of the wheel axle 234 and the center of gravity 232. In another implementation (not shown) the caster 110 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

Figure 2C:
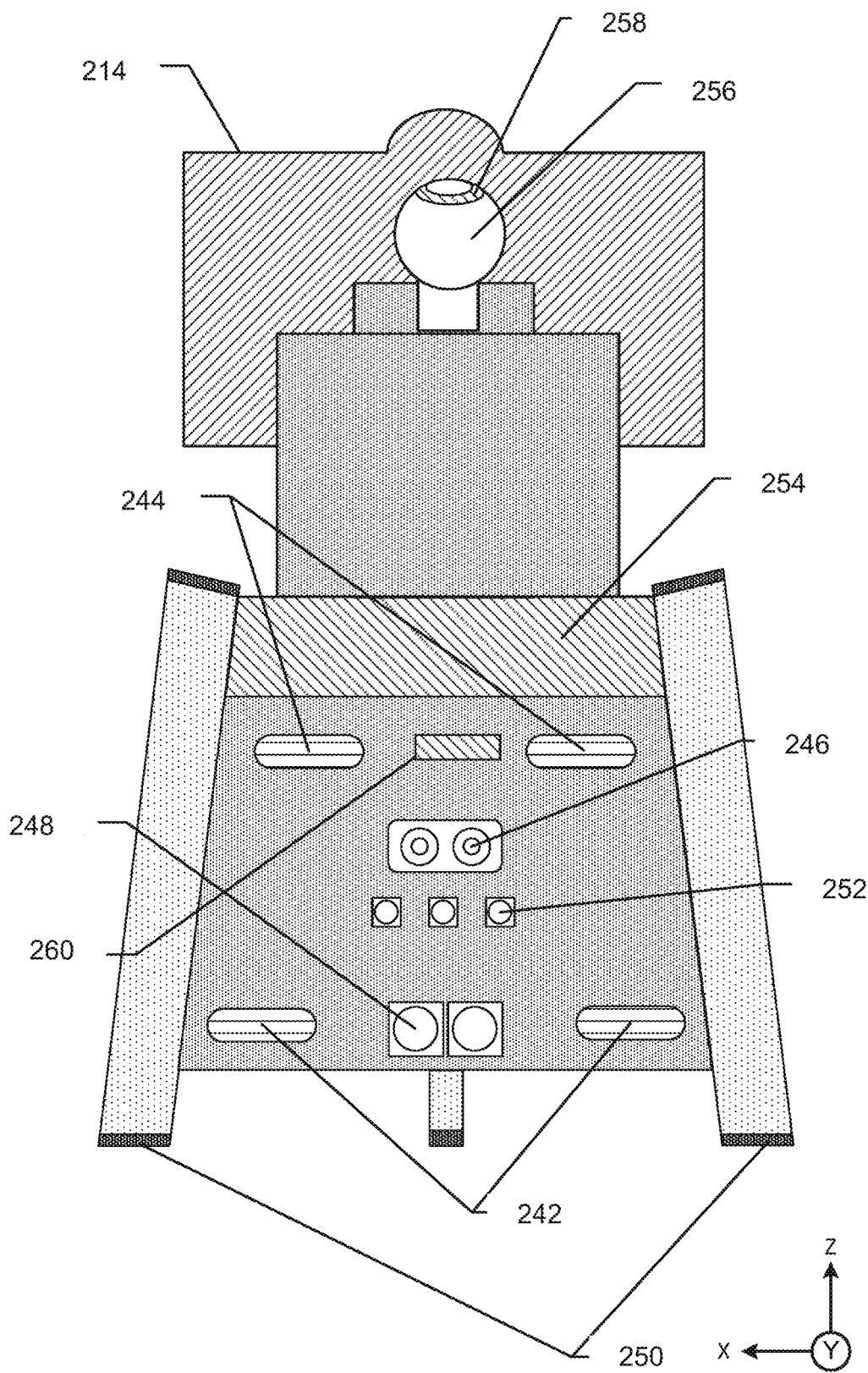

FIG. 2C illustrates a rear view of the device 110 according to various embodiments of the present disclosure. In this view, as with the front view, a first pair of optical sensors 242 are located along the lower edge of the rear of the robot 100, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258.

Figure 3:
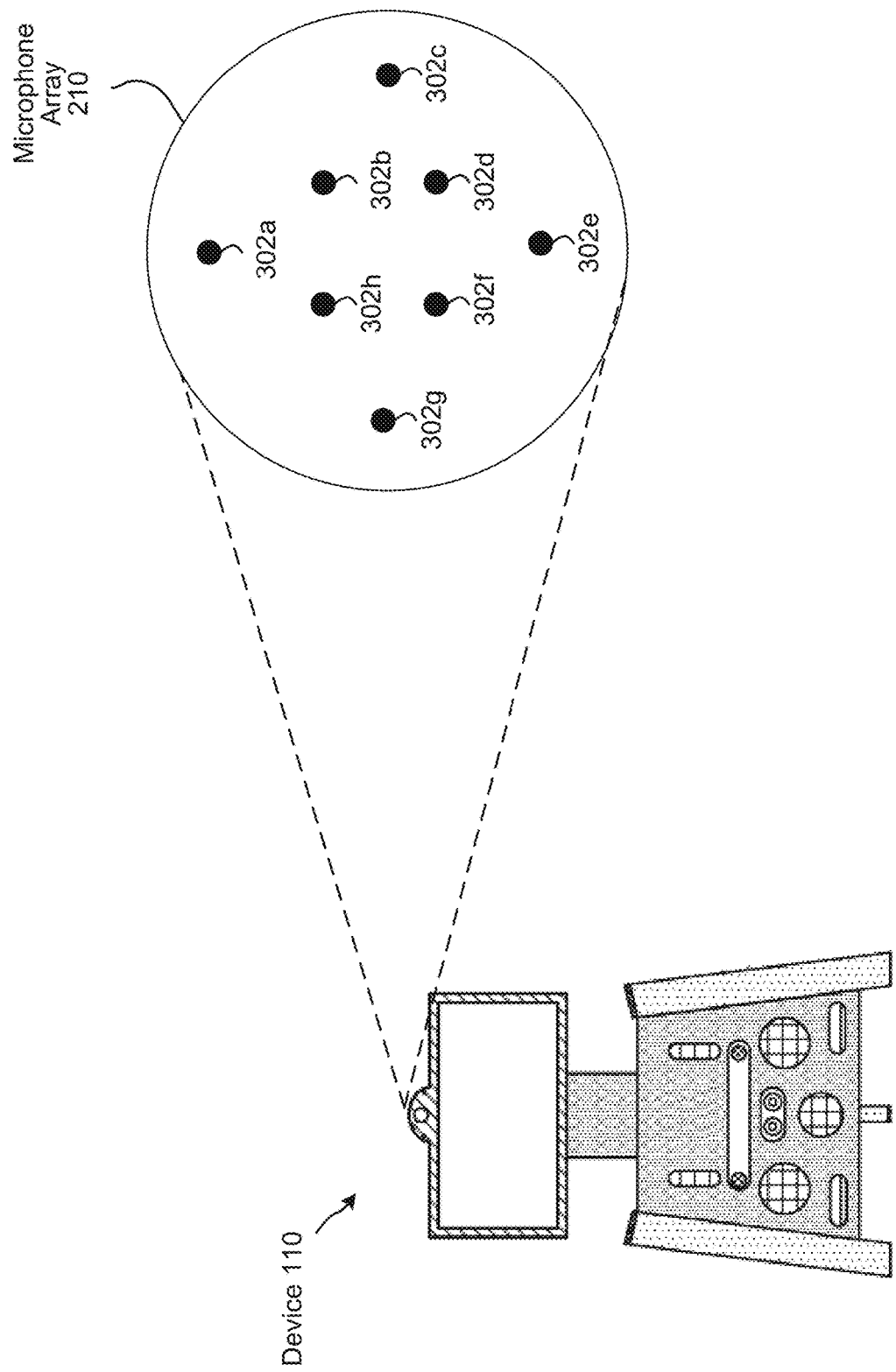
FIG. 3 illustrates a microphone array according to embodiments of the present disclosure.

FIG. 3 illustrates further details of the microphone array 210. In some embodiments, the microphone array 210 includes eight microphones 302a, 302b, 302c, 302d, 302e, 302f, 302g, and 302h, arranged in two concentric circles; the four microphones of one circle are rotated 45 degrees with respect to the four microphones of the other circle. The present disclosure is not, however limited to any particular number or arrangement of microphones.

The microphone array 210 may include a number of different individual microphones. The individual microphones may capture sound and pass the resulting audio signals created by the sound to downstream components, as discussed below. Each individual piece of audio data captured by a microphone may be in the time domain. To isolate audio from a particular direction, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 4:
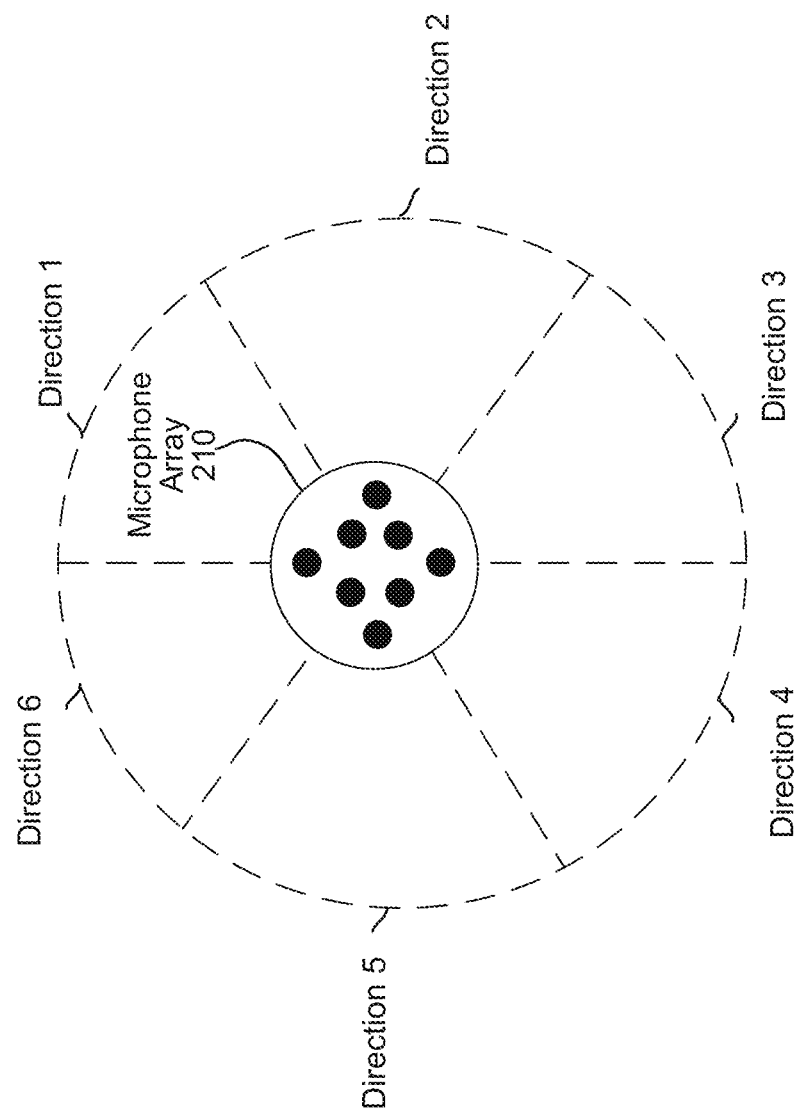
FIG. 4 illustrates beamforming directions according to embodiments of the present disclosure.
Figure 5:
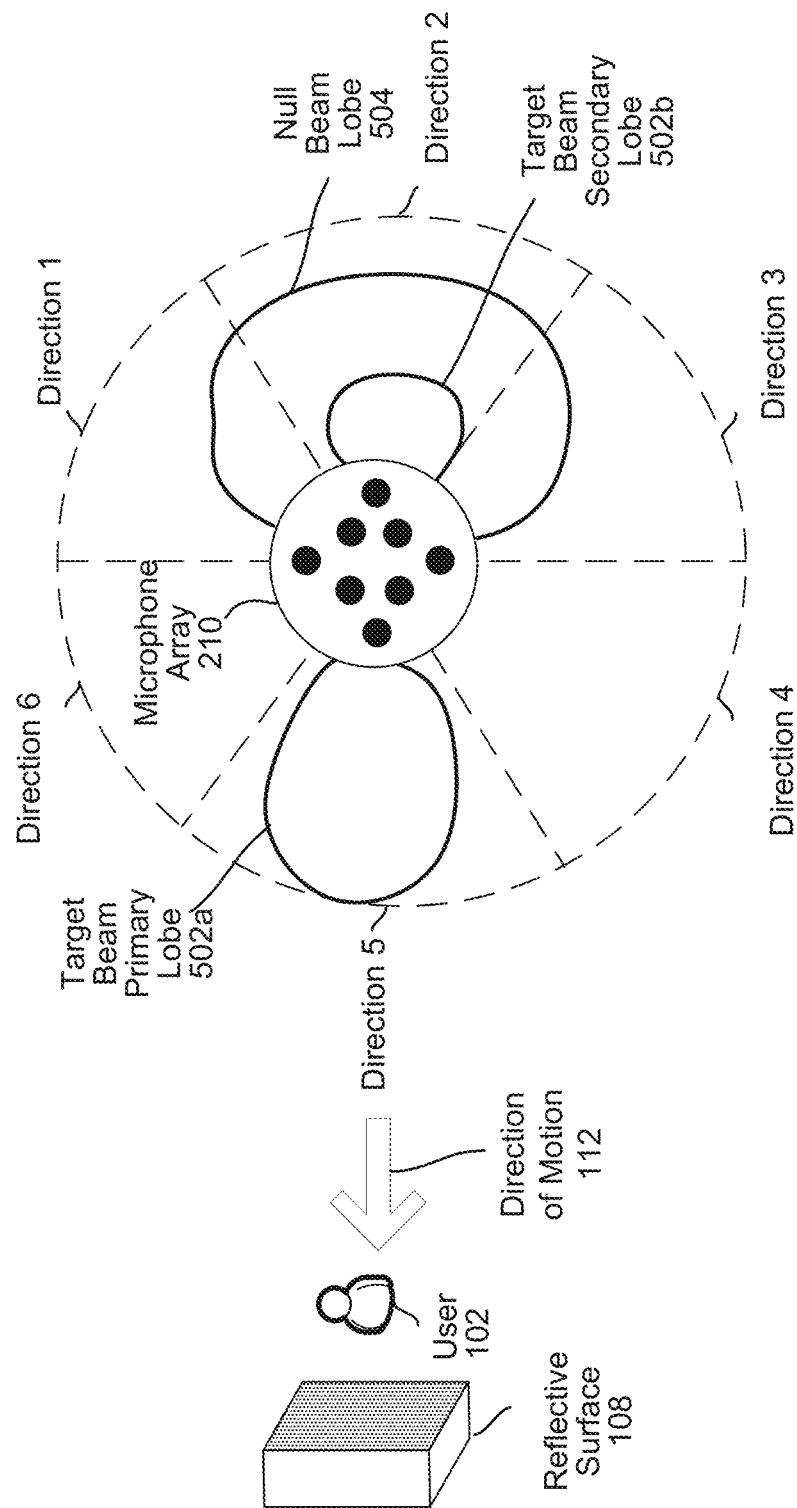
FIG. 5 illustrates beamforming directions using a moving microphone array according to embodiments of the present disclosure.

FIGS. 4 and 5 illustrate various aspects of beamforming using the device 110 and the microphone array 210. As discussed above, the device 110 may perform beamforming operations to generate beamformed audio data corresponding to different directions. As shown in FIG. 4, the device 110 may separate audio into six directions; any number of directions is, however, within the scope of the present disclosure. The number of directions may be the same as the number of microphones or may be greater or smaller.

In various embodiments, with reference to FIG. 5, the device 110 may be disposed proximate the user 102 in a direction 5 and may be moving in a direction of motion 112 toward the user 102 in the direction 5. A reflective surface 108, such as a wall, item of furniture, door, or other such surface, may also lie in the direction 5. Using a beam-selection component, as described in greater detail below, the device 110 may determine a user 102 is disposed in the direction 5 relative to the device and may thus capture audio corresponding to the user 102. A target beam corresponding to the direction 5 may include a target beam primary lobe 502a pointing toward the user 102 and a target beam secondary lobe 502b pointing away from the user 102. As shown in greater detail in FIGS. 7A-7H, the target beam may have multiple secondary lobes that point in other directions. The target beam primary lobe 502a and/or the target beam secondary lobe 502b may capture audio data that includes Doppler-shifted audio data due to reflections from the reflective surface 108.

The device 110 further, as described in greater detail below, determines a null beam having a null beam lobe 504 pointing in a direction opposite the target beam primary lobe 502a. The null beam lobe 504 may be selected such that it fully overlaps the target beam secondary lobe 502b (and any other target beam secondary lobes, if any). The device 110 may use data corresponding to the null beam lobe 504 to reduce or eliminate Doppler-shifted reflections in the target beam secondary lobe 502b.

Figure 6:
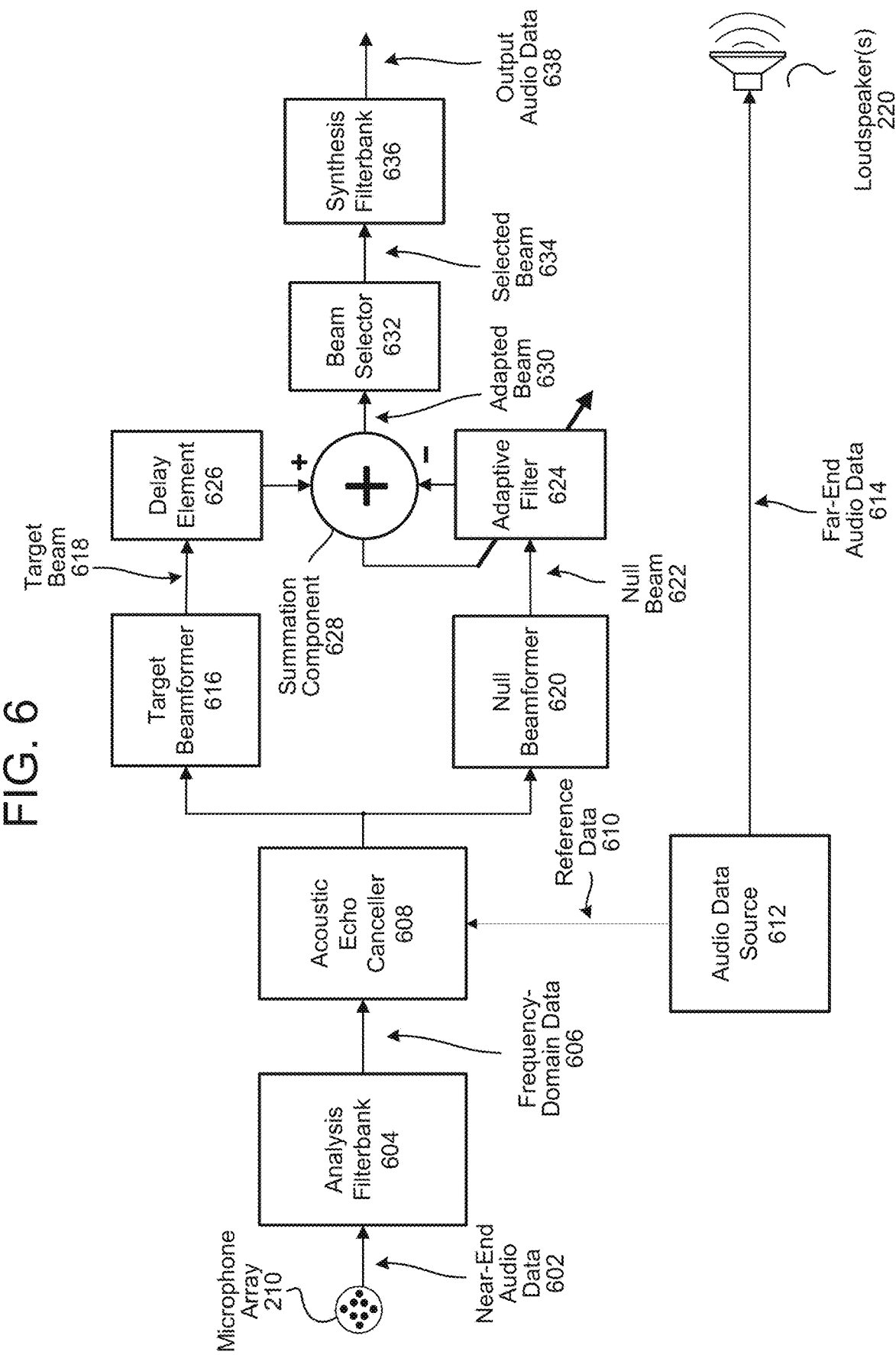
FIG. 6 illustrates a system for adaptive beamforming according to embodiments of the present disclosure.

FIG. 6 illustrates a system for beamforming that includes compensation for Doppler-shifted output audio reflections according to embodiments of the present disclosure. For clarity, single instances of each component of the system are illustrated; one of skill in the art will understand, however, that the system may include multiple instances of each component in accordance with each microphone 302 of the microphone array 210 and/or each frequency bin. In some embodiments, the system includes 8 microphones and 128 frequency bins. An overview of the system is first presented in the below paragraphs; each component is then described in greater detail.

In various embodiments, the microphone array 210 receives audio corresponding to the environment of the device 110 and transduces the audio into near-end audio data 602. An analysis filterbank 604 converts the audio data 602 into frequency-domain audio data 606 and may further separate the frequency-domain audio data 606 into two or more frequency ranges or "bins." An acoustic-echo cancellation component 608 may be used to remove reference audio data 610 from the frequency-domain audio data 606; this reference audio data 610 may be received from an audio data source 612, such as a far-end participant on a voice or video call. The far-end audio data 614 may be output using a loudspeaker 220; the near-end audio data 602 may include at least a portion of the far-end audio data 614 and/or reflections of the far-end audio data 614.

A target beamformer 616 may be used to determine target-beam audio data 618 corresponding to a target beam; this target beam audio data 618 may corresponds to a direction of a user and may further correspond to a direction of motion either toward or away from the user 102. A null beamformer 620 may be used to determine null-beam audio data 622 corresponding at least to a direction opposite the target beam; this null-beam audio data 622 may correspond to opposite a direction of a user and may further correspond to a direction of motion either toward or away from the user. An adaptive filter 624 may be used to model the acoustic pathway between the microphone array 210 and the loudspeaker 220; the adaptive filter 624 may also model the environment of the device 110, which may include reflective surfaces (and resultant reflections). A delay element 626 may delay the target-beam audio data 618 in accordance with the delay of the adaptive filter 624.

A summation component 628 may subtract the output of the adaptive filter 624 from the output of the delay element 626 to create adapted beam data 630 for each beam; in some embodiments, six summation components 628 create six sets of adapted beam data 630 corresponding to six directions. A beam selector 632 selects one of the beams to determine selected beam data 634 corresponding to a single beam. A synthesis filterbank 636 converts the frequency-domain selected beam data 634 into time-domain audio-output data 638. The output data 638 may be used for further processing, such as speech processing, and/or sent to a remote system.

Each of these components is now explained in greater detail.

The analysis filterbank 604 may perform a Fourier transform, such as a fast Fourier transform (FFT), and may include one or more uniform discrete Fourier transform (DFT) filterbanks, which convert the time-domain audio data 602 into the frequency-domain audio data 606. The frequency-domain audio data 606 may include a plurality of audio signals Y in the sub-band domain. The audio signals Y may incorporate audio signals corresponding to multiple different microphones 302 as well as different sub-bands (i.e., frequency ranges) as well as different frame indices (i.e., time ranges). Thus, the audio data 602 from the mth microphone 302 may be represented as $X_m(k,n)$, where k denotes the sub-band index, and n denotes the frame index. The combination of all audio signals for all m microphones 302 for a particular sub-band index frame index may be represented as $X(k,n)$.

The acoustic-echo cancellation component 608 may subtract the reference audio data 610 from the frequency-domain audio data 606 using, for example, hardware and/or software configured to subtract data representing a first signal from data representing a second signal. The acoustic-echo cancellation component 608 may delay the reference audio data 610 before subtracting it from the frequency-domain audio data 606 to account for the delay in outputting the far-end audio data 614 and re-receiving it via the microphone array 210. The acoustic-echo cancellation component 608 may include an adaptive filter, such as a finite impulse-response (FIR) filter, that is configured to minimize an error signal between an output of the filter and the near-end audio.

The target beamformer 616 and the null beamformer 620 are now described. In various embodiments, both beamformers 616, 620 are fixed beamformers configured to determine directional audio data in accordance with values of a matrix, referred to herein as a covariance matrix (in the case of the target beamformer 616) or a blocking matrix (in the case of the null beamformer 620). The target beamformer 616 boosts audio from a target direction while suppressing audio from other directions; the null beamformer 620 suppresses audio from the target direction while boosting audio from other directions, including a direction opposite the target direction.

As described herein, beamforming (e.g., performing a direction-based separation of audio data) corresponds to generating a plurality of directional audio signals (e.g., beamformed audio data) corresponding to individual directions relative to the microphone array 210. A first beam may correspond to first beamformed audio data associated with a first direction (e.g., portions of the input audio signals corresponding to the first direction), a second beam may correspond to second beamformed audio data associated with a second direction (e.g., portions of the input audio signals corresponding to the second direction), and so on. As used herein, "beams" refer to the beamformed audio signals that are generated by the beamforming operation. Therefore, a first beam corresponds to first audio data associated with a first direction, whereas a first directional calculation corresponds to the first filter coefficient values used to generate the first beam.

For example, the beamforming operation may individually filter input audio signals generated by multiple microphones 302 in the microphone array 210 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on.

To perform the beamforming operation, the beamformers 616, 620 may apply directional calculations to the input audio signals. In some examples, the beamformers 616, 620 may perform the directional calculations by applying filters to the input audio signals using filter coefficient values associated with specific directions. For example, the beamformers 616, 620 may perform a first directional calculation by applying first filter coefficient values to the input audio signals to generate the first beamformed audio data and may perform a second directional calculation by applying second filter coefficient values to the input audio signals to generate the second beamformed audio data.

In one example of a beamformer system, a fixed beamformer employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer may further include an adaptive beamformer that may adaptively cancel noise from different directions, depending on audio conditions.

Beamforming may be performed by determining filter coefficient values (e.g., Finite Impulse Response (FIR) filter coefficient values) for each beam direction (e.g., look direction, direction of interest, etc.) based on a position of physical microphones in the microphone array 210. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The filter coefficient values used to perform the beamforming operations may be calculated offline (e.g., preconfigured ahead of time) and stored in the device 110. In various embodiments, a computer model of the device 110 may be constructed using, for example, computer-aided design (CAD) software. The model may then be analyzed using a finite-element model (FEM) application; based on the FEM analysis, the acoustic properties of each microphone 302 may be determined for each incident angle. These properties may then be used to determine the values of the above-referenced matrices.

In various embodiments, beamforming is performed using a minimum-variance distortionless-response (MVDR) beamformer. A MVDR beamformer may apply filter coefficients, or "weights" w, to the frequency-domain signal in accordance with the below equation.

$$w = \frac{Q^{-1}d}{d^H Q^{-1} d} \quad (1)$$

In Equation (1), Q is the covariance and/or blocking matrix and may correspond to the cross-power spectral density (CPSD) of a noise field surrounding the device 110, and d is a steering vector that corresponds to a transfer function between the device 110 and a target source of sound located at a distance (e.g., two meters) from the device 110. The covariance matrix may define the spatial relationships between the microphones; this covariance matrix may include a number of covariance values corresponding to each pair of microphones. The covariance matrix is a matrix whose covariance value in the i, j position represents the covariance between the $i^{th}$ and $j^{th}$ elements of the microphone arrays. If the greater values of one variable mainly vary with the greater values of the other variable, and the same holds for the lesser values, (i.e., the variables tend to show similar behavior), the covariance is positive. In the opposite case, when the greater values of one variable mainly vary to the lesser values of the other, (i.e., the variables tend to show opposite behavior), the covariance is negative. In some embodiments, the covariance matrix is a spatial covariance matrix (SCM).

For example, a covariance value corresponding to the second row and third column of the matrix corresponds to the relationship between second and third microphones. In various embodiments, the values of the diagonal of the covariance matrix differ for the first and second microphone arrays; the covariance values of the diagonal corresponding to the first microphone may, for example, be greater than the covariance values of the diagonal corresponding to the second microphone. When input audio is processed with the covariance matrix, an utterance from an azimuth direction and/or elevation is more clearly distinguished and better able to be processed with, for example, ASR or speech-to-text processing.

In various embodiments, a different covariance and/or blocking matrix is determined for each of multiple frequency sub-bands. For example, a first covariance and/or blocking matrix is determined for frequencies between 20 Hz and 5 kHz; a second covariance and/or blocking matrix is determined for frequencies between 5 kHz and 10 kHz; a third covariance and/or blocking matrix is determined for frequencies between 10 kHz and 15 kHz; and a fourth and/or blocking covariance matrix is determined for frequencies between 15 kHz and 20 kHz. Any number of covariance and/or blocking matrices for any number or breakdown of frequency sub-bands is, however, within the scope of the present disclosure.

Various machine-learning techniques may be used to create the weight values of the covariance matrix. For example, a model may be trained to determine the weight values. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. In particular, CRFs are a type of discriminative undirected probabilistic graphical models and may predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves may be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The adaptive filter 624 may include one or more adjustable FIR filters that estimate the acoustic properties of the environment of the device 110 based on one or more transfer functions. The portion of the audible sound output by the loudspeaker 220 that reaches the microphone array 210 may be characterized based on a transfer function. A number of transfer functions may vary depending on the number of loudspeakers 220 and/or microphones 302. For example, a first portion of the sound output by the loudspeaker 220 and captured by a first microphone 302 in the microphone array 210 may be characterized by a first transfer function, and a second portion of the sound output by the loudspeaker 220 and captured by a second microphone in the microphone array 210 may be characterized by a second transfer function. The transfer functions may vary with the relative positions of the components and the acoustics of the room (e.g., environment surrounding the device 110). If the position of all of the objects in the room are static, the transfer functions are likewise static. When the device 110 moves, however, the transfer functions change.

To illustrate an example, the adaptive filter 624 may determine an estimated transfer function that models an acoustic path between the loudspeaker 220 and an individual microphone 302 in the microphone array 210. Thus, the adaptive filter 624 may include a first estimation filter block that uses a first estimated transfer function to model a first transfer function between the loudspeaker 220 and the first microphone 302 of the microphone array 210, a second estimation filter block that uses a second estimated transfer function that models a second transfer function between the loudspeaker 220 and a second microphone 302, and so on. The adaptive filter 624 may alter the characteristics of its transfer functions by altering one or more filter coefficients. The values of the filter coefficients may be determined and/or adjusted based at least in part on error data determined by the summation component 628. The error data may correspond to a change in magnitude of the output of the summation component 628; for example, the error data may indicate an increase in magnitude, which may correspond to less of the null beam data 622 being cancelled from the target-beam data 618, and the adaptive filter 624, in accordance with the error data, change one or more of its filter coefficients to decrease the magnitude of the output of the summation component 628.

As mentioned above, the delay element 626 may be used to account for the delay caused by the adaptive filter 624 such that the target-beam data 618 and the null-beam data 622 are aligned in time. In some embodiments, the delay element 626 is an FIR filter of similar size to that of the FIR filter of the adaptive filter 624; the FIR filter of the delay element 626 may, however, pass the target-beam data 618 without altering it.

The summation component 628 may, in some embodiments, receive additional inputs from additional beamformers and/or beams. If a noise source proximate the device 110 is detected using, for example, determining that a volume level of an input from an additional beamformer satisfies a condition (e.g., is greater than a threshold) or that a signal-to-interference ratio (SIR) determination component determines that a SIR of the input from the additional beamformer satisfies a condition (e.g., is greater than a threshold), a beam corresponding to a direction of the noise source may determine noise data corresponding to that direction. The noise source may be, for example, a second speaker, an electric fan, a television, or a barking dog. The summation component 628 may further subtract this noise data from the output of the delay element 626 to determine the adapted beam data 630.

A beam selector 632 receives the two or more adapted beam data 630 and, in accordance with the various techniques described herein, such as selecting a loudest beam, selects data corresponding to a selected beam 634. The beam selector 632 may select one or more of the beams as output beams. For example, the beam selector 632 may determine one or more signal quality values (e.g., loudness, SNR, power value, signal-to-noise plus interference ratio (SINR), and/or other signal quality metrics known to one of skill in the art) associated with each of the adapted beam data 630 and may select the adapted beam data 630 having the highest signal quality metric as the selected beam 634. In various embodiments, the beam selector 632 is capable of selecting a new beam every 100-200 milliseconds.

A synthesis filterbank 636 may be used to convert the frequency-domain data back to time-domain output audio data 638 using, for example, an inverse Fourier transform (such as an Inverse Fast Fourier Transform (IFFT)).

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal quality values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

The device 110 may use various techniques to determine the beam corresponding to the look direction. If audio is detected first by a particular microphone, the device 110 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

FIGS. 7A, 7B, 7C, 7D, 7E, 7F, 7G, and 7H illustrate exemplary target and null beams for a variety of frequencies: 200 Hz, 500 Hz, 1 kHz, 2 kHz, 4 kHz, 5 kHz, 6 kHz, and 7 kHz, respectively. For example, FIG. 7Aa illustrates a target beam at 200 Hz, and FIG. 7Ab illustrates a null beam at 200 Hz. Each of these figures illustrates the target beam pointing at 0 degrees and the null beam pointing away from 0 degrees (e.g., the null beam points at 180 degrees). The present disclosure is not, however, limited to only these orientations, and the target and null beams may point in any direction relative to device (while maintaining the same orientation relative to each other—e.g., they both rotate around the device together). In various embodiments, the null beam lobes fully overlap with any corresponding target beam secondary lobes without significantly overlapping with the target beam primary lobe. The null beam lobes may have different shapes for each frequency; these shapes may be determined by the shapes of the primary beam lobes at that frequency. In various embodiments, the null beam lodes do not extend past a 60 degree range of angles centered in the target direction—that is, given a target direction of 0 degrees, the null beam lobes substantially do not extend past +/−30 degrees on either side. The null beamformer may generate a null beam having one or more lobes for each frequency.

Figure 8:
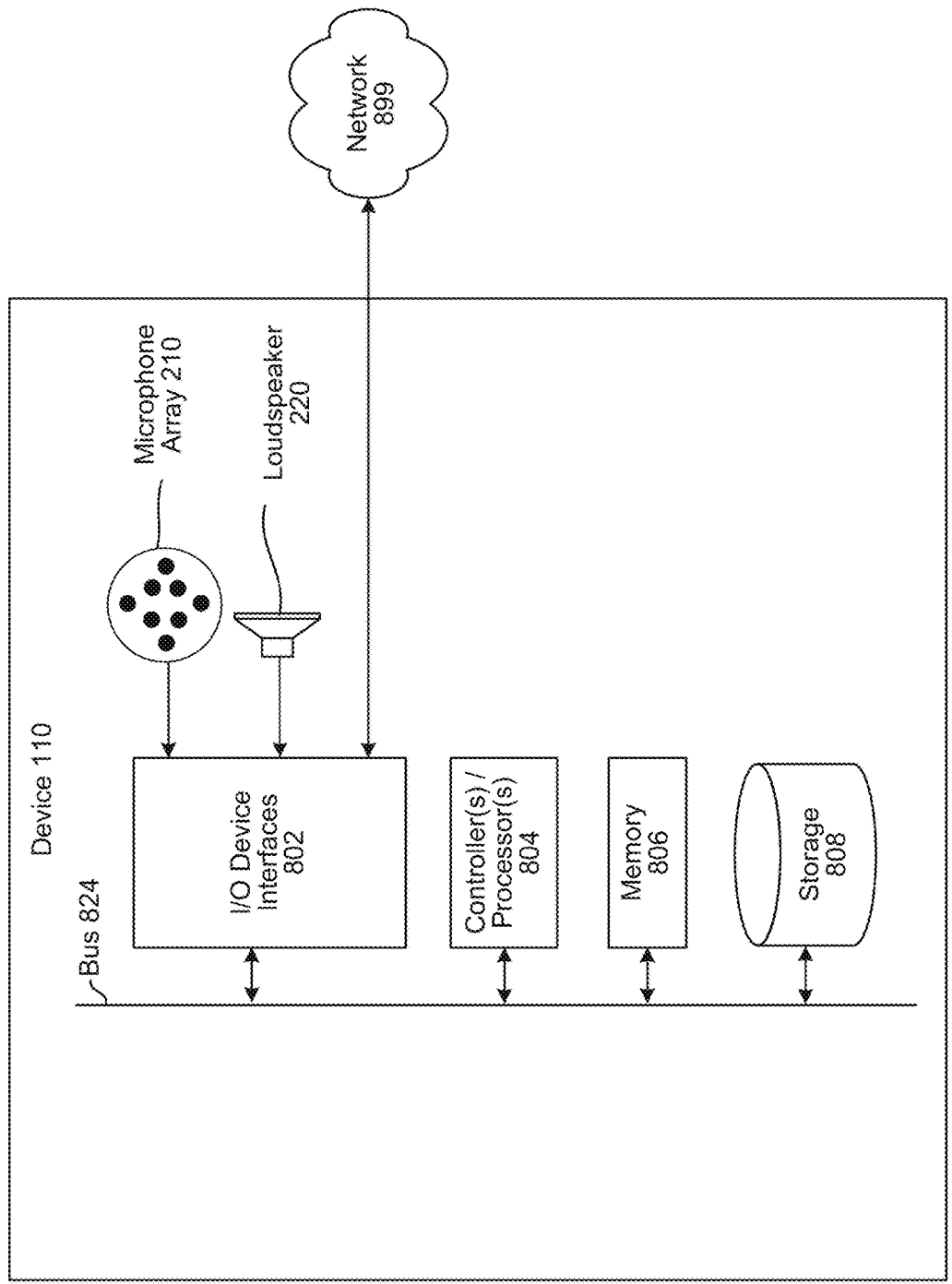
FIG. 8 illustrates a system for adaptive beamforming according to embodiments of the present disclosure.

FIG. 8 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 210 which may include a plurality of microphones. The audio capture device(s) may be integrated into a single device or may be separate. The device 110 may also include a built-in audio output device for producing sound, such as built-in loudspeaker(s) 220. The audio output device may be integrated into a single device or may be separate. The device 110 may include an address/data bus 824 for conveying data among components of the device 110. Each component within the device may also be directly connected to other components in addition to (or instead of) being connected to other components across the bus 824.

The device 110 may include one or more controllers/processors 804, which may each include a central processing unit (CPU) for processing data and computer-readable instructions, and a memory 806 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 may include input/output device interfaces 802. A variety of components may be connected through the input/output device interfaces 802, such as the microphone array 210, the built-in loudspeaker(s) 220, and a media source such as a digital media player (not illustrated). The input/output interfaces 802 may include A/D converters (not illustrated) and/or D/A converters (not illustrated).

The input/output device interfaces 802 may also include an interface for an external peripheral device connection such as universal serial bus (USB), FireWire, Thunderbolt or other connection protocol. The input/output device interfaces 802 may also include a connection to one or more networks 899 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 899, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

Figure 9:
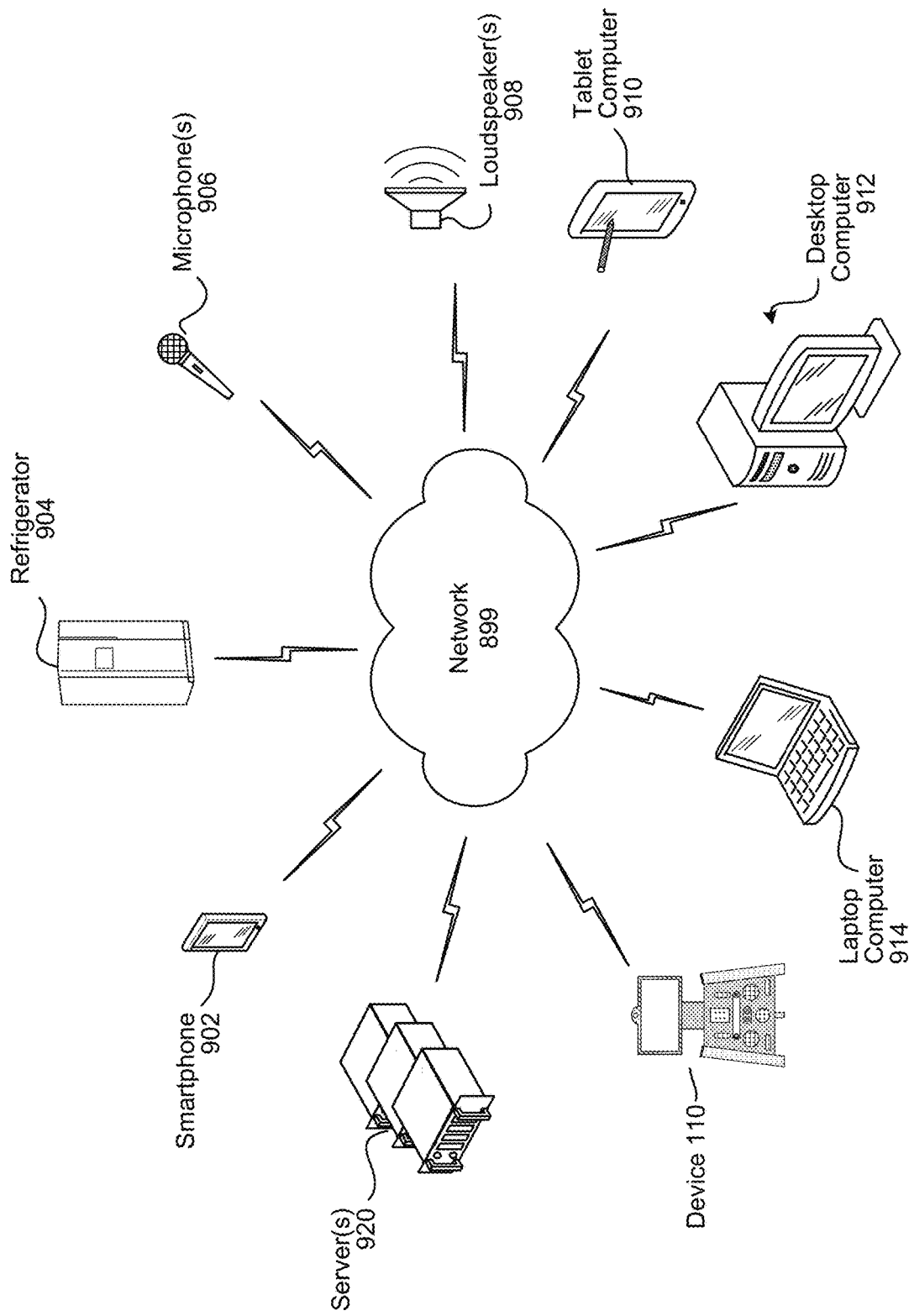
FIG. 9 illustrates a network including a system for adaptive beamforming according to embodiments of the present disclosure.

As illustrated in FIG. 9, the device 110 may be connected over a network(s) 899. The network(s) 899 may include a local or private network or may include a wide network such as the Internet. Devices may be connected to the network(s) 899 through either wired or wireless connections. For example, the device 110, a smart phone 902, a smart refrigerator 904, a wireless microphone 906, a wireless loudspeaker 908, a tablet computer 910, a desktop computer 912, and/or a laptop computer 914 may be connected to the network(s) 899 through a wireless service provider, over a WiFi or cellular network connection, or the like. Other devices are included as network-connected support devices, such as a server 920. The support devices may connect to the network(s) 899 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for compensating for Doppler effects in reflected output audio using a voice-controlled device capable of autonomous motion, the method comprising:
   causing an autonomously motile device to move in a first direction in an environment;
   while the autonomously motile device is moving in the first direction, outputting, using a loudspeaker of the autonomously motile device, output audio;
   receiving, from a microphone array of the autonomously motile device, input audio data, the input audio data including a representation of at least a portion of the output audio;
   determining, using a first target beamformer and the input audio data, first audio data corresponding to the first direction;
   determining, using a first null beamformer and the input audio data, second audio data corresponding to a second direction opposite the first direction;
   determining, using a second target beamformer and the input audio data, third audio data corresponding to the second direction;
   determining, using a second null beamformer and the input audio data, fourth audio data corresponding to the first direction;
   subtracting the second audio data from the first audio data to generate first target audio data;
   subtracting the fourth audio data from the third audio data to generate second target audio data; and
   sending, based at least in part on the first target audio data, speech data to a speech-processing system.

2. The computer-implemented method of claim 1, further comprising:
   receiving, at an adaptive filter, an output of the first null beamformer;
   determining, using the adaptive filter, an estimation of noise audio data in the environment;
   determining, based at least in part on the noise audio data, error data corresponding to an increase in magnitude of a first output of the adaptive filter;
   determining a filter coefficient of the adaptive filter based at least in part on the error data; and
   determining, using the filter coefficient, a second output of the adaptive filter.

3. The computer-implemented method of claim 1, further comprising:
   determining, using a third beamformer and the input audio data, fifth audio data corresponding to a third direction, the third direction different from the first direction and the second direction;
   determining that a volume level corresponding to the fifth audio data is greater than a threshold; and determining the speech data by subtracting the fifth audio data from the first target audio data.

4. The computer-implemented method of claim 1, further comprising:
prior to sending the speech data, receiving, from an audio data source, reference audio data,
wherein determining the first audio data is further based at least in part on subtracting the reference audio data from the input audio data.

5. A computer-implemented method comprising:
causing an autonomously motile device to move linearly toward a first direction and away from a second direction opposite the first direction;
while the autonomously motile device is moving linearly toward the first direction:
receiving, from a microphone array of the autonomously motile device, input audio data,
determining, using a first beamformer and the input audio data, first audio data corresponding to the first direction, the first audio data including first Doppler data,
determining, using a second beamformer and the input audio data, second audio data corresponding to the second direction, and
subtracting the second audio data from the first audio data to remove the first Doppler data from the first audio data and to generate third audio data; and
generating, based at least in part on the third audio data, output data.

6. The computer-implemented method of claim 5, further comprising:
determining, using a third beamformer and the input audio data, fourth audio data corresponding to the second direction, the fourth audio data including second Doppler data;
determining, using a fourth beamformer and the input audio data, fifth audio data corresponding to the first direction; and
subtracting the fifth audio data from the fourth audio data to remove the second Doppler data from the fourth audio data and to generate sixth audio data,
wherein determining the output data is further based at least in part on the sixth audio data.

7. The computer-implemented method of claim 6, further comprising:
determining a first quality metric corresponding to the third audio data;
determining a second quality metric corresponding to the sixth audio data; and
determining that the first quality metric corresponds to a higher quality than does the second quality metric.

8. The computer-implemented method of claim 5, further comprising:
determining, using a filter and the second audio data, an estimation of noise audio data;
determining, based at least in part on the noise audio data, error data corresponding to an increase in magnitude of the estimation; and
determining a filter coefficient of the filter based at least in part on the error data.

9. The computer-implemented method of claim 5, further comprising:
determining, using a third beamformer and the input audio data, fourth audio data corresponding to a third direction, the third direction different from the first direction and the second direction; and
determining that the fourth audio data corresponds to a source of noise,
wherein determining the output data further comprises subtracting the fourth audio data from the first audio data.

10. The computer-implemented method of claim 5, further comprising:
prior to determining the output data, receiving, from an audio data source, reference audio data,
wherein determining the first audio data is further based at least in part on subtracting the reference audio data from the input audio data.

11. The computer-implemented method of claim 5, further comprising:
determining, using the first beamformer, a target beam primary lobe and a target beam secondary lobe; and
determining, using the second beamformer, a null beam lobe,
wherein the target beam primary lobe corresponds to the first direction and wherein the null beam lobe fully overlaps the target beam secondary lobe.

12. The computer-implemented method of claim 11, further comprising:
determining, using a third beamformer corresponding to a first frequency, a second target beam primary lobe and a second target beam secondary lobe; and
determining, using a fourth beamformer corresponding to the first frequency, a second null beam lobe,
wherein the first beamformer and the second beamformer correspond to a second frequency different from the first frequency, and
wherein a first shape of the null beam lobe differs from a second shape of the second null beam lobe.

13. The computer-implemented method of claim 5, wherein:
the first audio data corresponding to the first direction includes frequency-shifted audio data; and
subtracting the second audio data from the first audio data causes the frequency-shifted audio data to be removed from the first audio data to generate the third audio data.

14. A system comprising:
at least one processor; and
at least one memory including instructions that, when executed by the at least one processor, cause the system to:
cause an autonomously motile device to move linearly toward a first direction and away from a second direction opposite the first direction;
while the autonomously motile device is moving linearly toward the first direction:
receive, from a microphone array of the autonomously motile device, input audio data,
determine, using a first beamformer and the input audio data, first audio data corresponding to the first direction, the first audio data including first Doppler data,
determine, using a second beamformer and the input audio data, second audio data corresponding to the second direction, and
subtract the second audio data from the first audio data to remove the first Doppler data from the first audio data and to generate third audio data; and
generate, based at least in part on the third audio data, output data.

15. The system of claim 14, wherein the at least one memory further comprises instructions that, when executed by the at least one processor, further cause the system to:
- determine, using a third beamformer and the input audio data, fourth audio data corresponding to the second direction, the fourth audio data including second Doppler data;
- determine, using a fourth beamformer and the input audio data, fifth audio data corresponding to the first direction; and
- subtract the fifth audio data from the fourth audio data to remove the second Doppler data from the fourth audio data and to generate sixth audio data,
- wherein determining the output data is further based at least in part on the sixth audio data.

16. The system of claim 15, wherein the at least one memory further comprises instructions that, when executed by the at least one processor, further cause the system to:
- determine a first quality metric corresponding to the third audio data;
- determine a second quality metric corresponding to the sixth audio data; and
- determine that the first quality metric corresponds to a higher quality than does the second quality metric.

17. The system of claim 14, wherein the at least one memory further comprises instructions that, when executed by the at least one processor, further cause the system to:
- determine, using a filter and the second audio data, an estimation of noise audio data;
- determine, based at least in part on the noise audio data, error data corresponding to an increase in magnitude of the estimation; and
- determine a filter coefficient of the filter based at least in part on the error data.

18. The system of claim 14, wherein the at least one memory further comprises instructions that, when executed by the at least one processor, further cause the system to:
- determine, using a third beamformer and the input audio data, fourth audio data corresponding to a third direction, the third direction different from the first direction and the second direction; and
- determine that the fourth audio data corresponds to a source of noise,
- wherein determining the output data further comprises subtracting the fourth audio data from the first audio data.

19. The system of claim 14, wherein the at least one memory further comprises instructions that, when executed by the at least one processor, further cause the system to:
- prior to determining the output data, receive, from an audio data source, reference audio data,
- wherein determining the first audio data is further based at least in part on subtracting the reference audio data from the input audio data.

20. The system of claim 14, wherein the at least one memory further comprises instructions that, when executed by the at least one processor, further cause the system to:
- determine, using the first beamformer, a target beam primary lobe and a target beam secondary lobe; and
- determine, using the second beamformer, a null beam lobe,
- wherein the target beam primary lobe corresponds to the first direction and wherein the null beam lobe fully overlaps the target beam secondary lobe.

21. The system of claim 20, wherein the at least one memory further comprises instructions that, when executed by the at least one processor, further cause the system to:
- determine, using a third beamformer corresponding to a first frequency, a second target beam primary lobe and a second target beam secondary lobe; and
- determine, using a fourth beamformer corresponding to the first frequency, a second null beam lobe,
- wherein the first beamformer and the second beamformer correspond to a second frequency different from the first frequency, and
- wherein a first shape of the null beam lobe differs from a second shape of the second null beam lobe.

* * * * *